May 19, 1953  O. R. GRUBER  2,639,120
TRAILER TONGUE AND ADJUSTABLE HITCHING STAND THEREFOR
Filed May 16, 1951
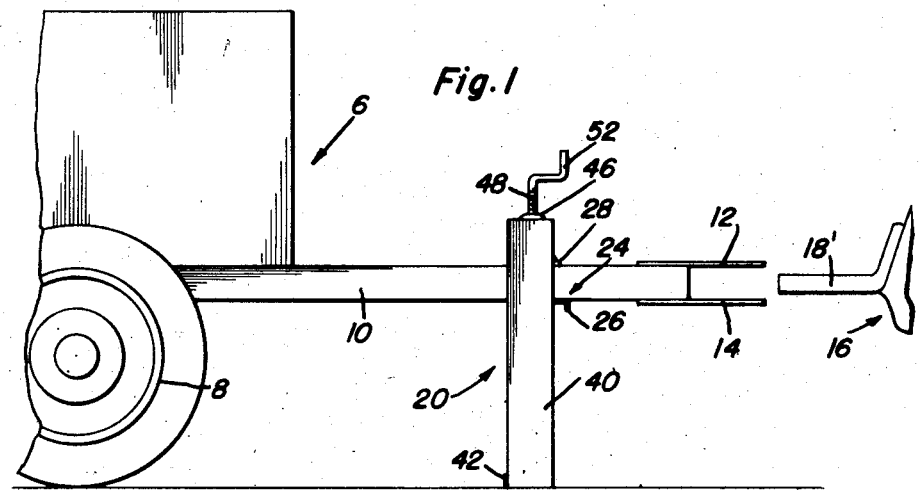
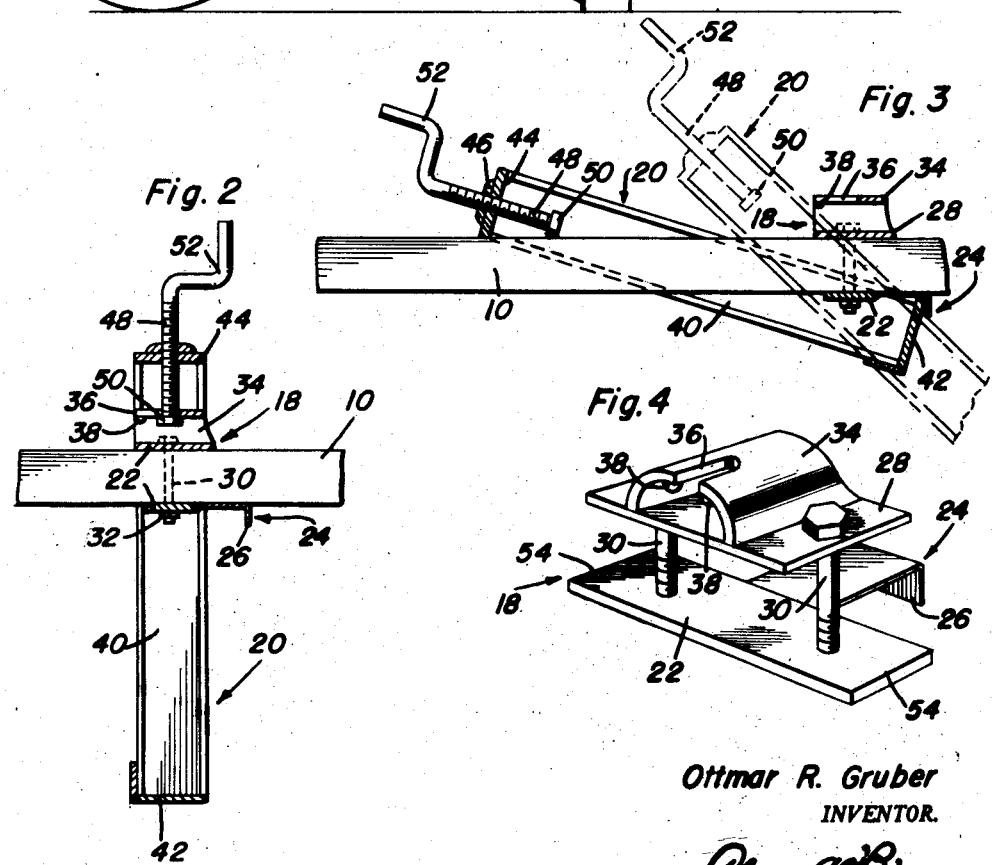
Ottmar R. Gruber
INVENTOR.

Patented May 19, 1953

2,639,120

UNITED STATES PATENT OFFICE 2,639,120

TRAILER TONGUE AND ADJUSTABLE
HITCHING STAND THEREFOR

Ottmar R. Gruber, Fontanelle, Iowa

Application May 16, 1951, Serial No. 226,603

4 Claims. (Cl. 254—86)

The present invention relates to certain new and useful improvements in draft tongue elevating and supporting devices and has more particular reference to a device which is herein identified as a stand, the latter being characterized by a jack screw and the over-all means being especially adapted to hold the tongue of a trailer, such as a farm wagon, in a given plane to facilitate the step of hitching a tractor or the like thereto.

As the introductory statement of the invention obviously implies, draft tongue elevating and supporting jacks and the like are not new. An example of a prior art device structurally and functionally similar to that to be hereinafter specifically revealed is disclosed in a patent to L. B. Neighbour et al., 2,245,935 of June 17, 1941. As will be hereinafter clarified, the instant invention has to do with an analogous construction which is possessed of significant structural refinements and improvements which, taken in a cumulative manner, go to make up a novel contribution to this specific line of endeavor.

An equally general object of the invention is to provide an adjustable hitching stand and ways and means wherein same is adaptably fastened on the tongue, whereby to provide a structure which is better adapted to serve intended purposes, is simple, practical, easy to attach and adjust and, is therefore, capable of meeting the apparent requirements of manufacturers and users alike.

Briefly summarized, the preferred embodiment of the invention is characterized by two essential units; namely, a novel adapter fixture or clamp which is applicable to the draft tongue, and a complemental leg frame, the latter being slidably and pivotally connected with the adapter fixture and carrying a jack screw which is both adjustably and detachably connectable with said fixture.

More specifically, novelty is predicated on an adapter fixture which is made up of clamping plates bolted on the tongue, the upper clamping plate being provided with a keeper bracket and the lower plate being provided with a hook which assists in holding the leg frame in an elevated, out-of-the-way position when said frame is not in active use.

Then, too, novelty is predicated on a rectangular leg frame which constitutes the stand proper, said frame carrying the aforementioned jack screw and having longitudinal side members which are channel-shaped in cross-section to provide keyways for coating end portions of the lower plate of the aforementioned adapter fixture.

Other objects and advantages will become more readily apparent from the following description and the accompanying sheet of illustrative drawings.

In the accompanying sheet of drawings, wherein like numerals are employed to designate like parts throughout the views:

Figure 1 is a side elevational view showing a fragmentary portion of a trailer vehicle, wagon or the like with a draft tongue, showing the hitch means in readiness to be lined up and coupled and showing, in addition, the tongue supporting and line-up stand;

Figure 2 is a fragmentary view with the tongue in elevation and with the parts of the over-all stand construction partly in elevation but primarily in section;

Figure 3 is a view based on Figure 2 and showing in full and dotted lines the manner in which the leg frame or stand is lifted up to an out-of-the-way transporting position; and Figure 4 is a enlarged perspective view of the adapter fixture.

Referring first to Figure 1, the numeral 6 designates any suitable trailer vehicle. This may be a farm wagon, a two-wheeled trailer cart, a manure spreader or the like, the same having supporting wheels 8 and a draft tongue 10 with suitable hitching elements 12 and 14. The numeral 16 designates a towing or other powering vehicle, such as a tractor, having a hitch member 18' for separable connection or coupling with the members or elements 12 and 14. These are obviously old parts.

The invention, as before stated, is characterized by two essential or primary units; namely, the adapter fixture 18 on the one hand and the stand or leg frame unit 20, on the other. The unit 18 is in the nature of a two-part clamp and comprises a lower rectangular plate 22 which underlies the draft tongue in the manner shown. It is provided on its forward longitudinal edge portion with a stand retaining clip or hook 24 which has a depending bill portion 26. The complemental top plate is also rectangular and is denoted by the numeral 28 and is shorter than the plate 22. It is secured by bolts 30 and nuts 32 to the plate 22. There is an arched bracket 34 formed integral with the intermediate portion of the upper plate and this has a notch 36 in one edge and detent bosses 38—38 associated therewith. It is believed that these features 34 to 38 may be described, in a unitary sense, as a keeper. The latter makes it possible to separably adjoin the two units 18 and 20. In practice, the unit 18 is bolted in the desired clamped position on the draft tongue in the manner shown.

The stand or leg frame unit 20 is a simple rectangular frame and comprises a pair of longitudinal spaced parallel channel-irons 40—40 joined together at their lower ends by an angle iron 42. There is a simple cross-piece 44 between the upper ends and this is centrally apertured and provided with nut means 46 to accommodate the threaded shank of the jack screw.

The shank is denoted at 48 and is screwed through the nut and provided with a coupling head 50. Then, too, there is a crank handle 52 at the opposite end.

By scrutinizing the drawings and relative proportions of the parts carefully, the reader will observe that it is necessary that the length of the plate 28 be such that it swings freely without obstruction through the slot defined by the leg frame, that is, the slot between the channel irons 40. On the other hand, extended end portions 54—54 of the bottom plate are both slidably and rotatably keyed in the channels of the channel-irons. Thus, the "channels" become keyways.

Let it be assumed, then, that the unit 18 is clamped on the intermediate portion of the draft tongue 10 and is bolted securely in place with the keeper slot 36 directed toward the forward end of the trailer vehicle. The projecting end portions or keys 54—54 are keyed in the keyways of the channel-irons 40. Consequently, the leg frame 20 is not only slidable up and down in relation to the adapter fixture 18 but is also pivoted thereon so that said frame may be swung from the perpendicular or vertical position in Figures 1 and 2 to the inclined out-of-the-way non-using position shown in full lines in Figure 3. The intermediate dotted line position shows, too, that said leg frame may be swung from the position shown in Figure 3 to a position where the headed end 50 of the jack screw is lined with the keeper notch 36 to thus couple the jack screw with the keeper and consequently to couple the two units 18 and 20 together for operative association. Not only does this functioning of parts couple the units but it also provides a separable connection and, more importantly, provides a jack screw connection between the stand on the one hand and the tongue carried adapted fixture 18 on the other hand. Obviously, when the leg frame is up and out of the way, as shown to the left in full lines in Figure 3, the channel-iron 42 is then releasably engaged with the retaining hook 24, the latter serving to assist in holding the leg frame in the out-of-the-way position. The leg frame is, of course, quite heavy and once it swings over to the leaning or inclined position shown in Figure 3, it is substantially "put."

Briefly, the following constitute advantages of the tongue supporting and hitching stand, to wit:

1. The level of the tongue or hitch being supported may be raised or lowered easily by simply turning the crank in the proper direction.

2. When the stand is not in use it may be folded back on the tongue or hitch, out of the way, and will stay in place.

3. It is lightweight and strong. It may be fabricated easily and at low cost.

4. It is adjustable to any size tongue or hitch and it is not necessary to drill any hole in the tongue or hitch to attach same. It simply slides over the end of the tongue or hitch and then secured in place by tightening the bolts.

It is though that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. In combination, a mobile vehicle embodying a horizontal draft tongue, an adapter fixture embodying upper and lower plates bolted on the tongue, a keeper fixed on the upper plate, and a leg frame embodying channel-shaped side members slidably and pivotally connected with the respective end portions of one of said plates, said frame including a stationary jack-screw and said jack-screw being releasably engageable with said keeper.

2. A draft tongue attachment comprising, in combination, an adapter fixture embodying bolted upper and lower plates, said upper plate being provided with an arched bracket formed with a notch and providing a keeper, the end portions of the lower plate projecting beyond corresponding end portions of the upper plate and constituting keying elements, and a leg frame of rectangular form embodying spaced parallel channel members defining keyways, said keying elements projecting into the keyways and said channel members being slidable relative to said keying elements, and a jack screw mounted in one end of said leg frame and having a head separably cooperable with said keeper.

3. In combination, a draft tongue, an adapter fixture embodying an upper plate resting transversely atop said tongue and of a length corresponding with the width of said tongue, a lower plate underlying the bottom of the tongue, bolts securing said plates in spaced parallelism and clamping them on said tongue, the opposite ends of said lower plate projecting beyond the vertical sides of said tongue and providing keying elements, a rectangular leg frame embodying rigidly interconnected side members, the latter channel-shaped in cross-section with their channel sides facing each other and providing keyways, said keying elements projecting into said keyways and affording a mechanical assembling and sliding connection between the frame and adapter fixture and allowing said frame to slide on said fixture and to assume a vertical in use position and a folded out-of-use position on said tongue, a keeper bracket fixed on said upper plate, and a jack-screw carried by the upper end of said frame and engageable with said keeper bracket.

4. The structure defined in claim 3, wherein said bracket is arched and notched, and said lower plate is provided with hook means to assist in holding said frame in said out-of-use position.

OTTMAR R. GRUBER.

References Cited in the file of this patent

UNITED STATES PATENTS

| Number | Name | Date |
|---|---|---|
| 2,245,935 | Neighbour et al. | June 17, 1941 |
| 2,580,545 | Hill | Jan. 1, 1952 |

FOREIGN PATENTS

| Number | Country | Date |
|---|---|---|
| 437,831 | Great Britain | Nov. 6, 1935 |
| 607,555 | Great Britain | Sept. 1, 1948 |